United States Patent [19]
Williams

[11] 4,102,187
[45] Jul. 25, 1978

[54] FLUID FLOW METER

[75] Inventor: Keith A. Williams, Bartlesville, Okla.

[73] Assignee: Phillips Petroleum Company, Bartlesville, Okla.

[21] Appl. No.: 827,762

[22] Filed: Aug. 25, 1977

[51] Int. Cl.$^2$ .................................................. G01F 1/22
[52] U.S. Cl. ................................... 73/209; 116/117 C
[58] Field of Search .......... 73/209; 116/117 C, 117 R

[56] References Cited
U.S. PATENT DOCUMENTS

| | | | |
|---|---|---|---|
| 1,454,301 | 5/1923 | Van Hise | 73/209 |
| 3,310,985 | 3/1967 | Belsterling | 73/515 |
| 3,403,563 | 10/1968 | Bowles | 73/515 |

Primary Examiner—James J. Gill

[57] ABSTRACT

A fluid flow meter of fluid-tight, sandwiched assembly of three flat faced plates with transparent, fluid impervious sheets interposed between the plates. The central plate is symmetrically tapered to be wider at the upper end than at the lower end. Each of the three plates has at least one elongated slot cut therethrough with the slots in coplanar alignment in the sandwiched assembly. The central, tapered plate has extensions at either end of the slot cut less than all the way through from the same side of the plate. The plate and transparent sheet adjacent to the side of the tapered plate containing the slot extension have perforations therethrough aligned to permit passage of fluid from the outside of the meter through the extensions to the slot in the central plate. A plummet is inserted in the slot in the second plate.

8 Claims, 3 Drawing Figures

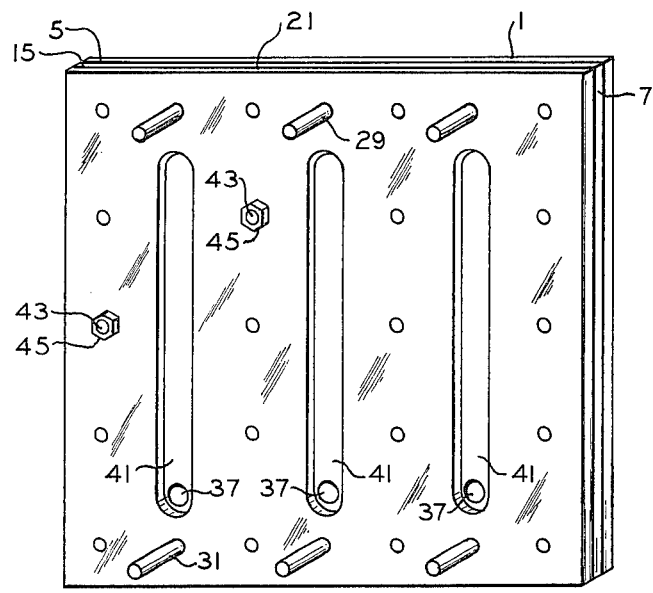
FIG. 3
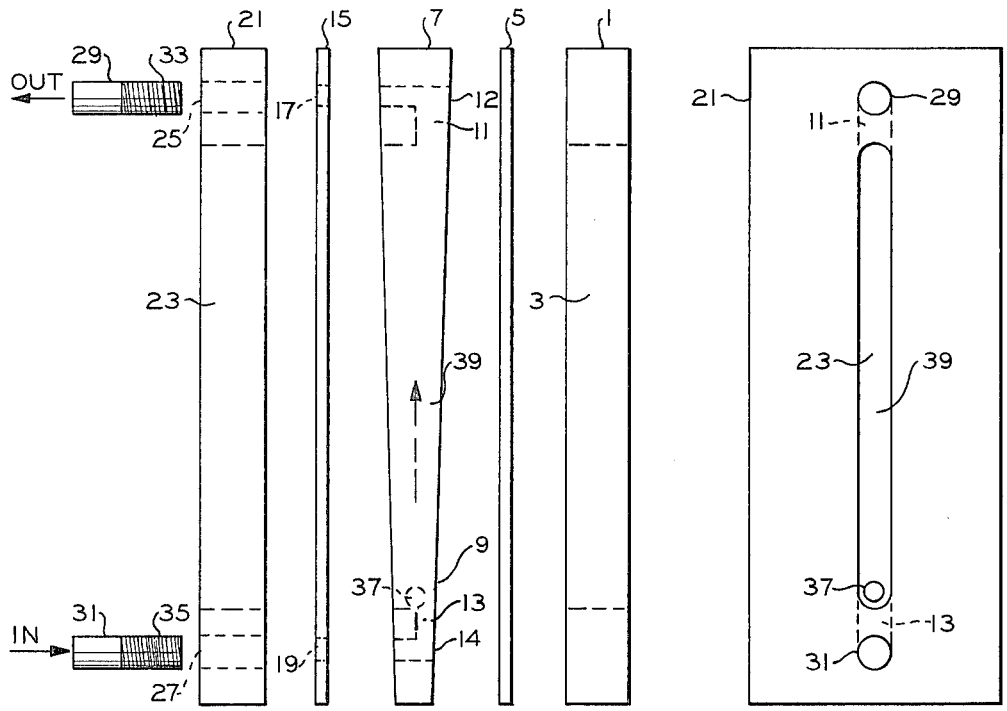
FIG. 1
FIG. 2

FLUID FLOW METER

BACKGROUND OF THE INVENTION

This invention relates to fluid flow meters. In one of its aspects this invention relates to the construction of fluid flow meters. In another of its aspects this invention relates to fluid flow meters of the variable area type (rotameter).

Fluid flow meters of the variable area type having plummet cavities of rectangular cross-section are well known in the art. The present invention provides a construction for such a fluid flow meter in which there is a rectangular cross-section through the flow cavity with the cavity having two parallel sides and two sides forming a wedge-shaped opening so that the plummet sits loosely in the base of the rectangular space at the bottom of the cavity. The body of the cavity diverges upward in the shape of a truncated pyramid so that a plummet placed in this chamber can be carried by fluid flowing upwardly through the chamber and the flow of the fluid is indicated by the height attained by the plummet. Such devices have been produced by milling appropriately tapered cavities in solid blanks, but such production requires expensive procedures. The fluid flow meter of the present invention incorporates ease of construction with uncomplicated design to provide a relatively inexpensive fluid flow meter having a wedge-shaped plummet cavity.

It is, therefore, an object of this invention to provide a fluid flow meter having a wedge-shaped plummet cavity. It is another object of this invention to provide a fluid flow meter of comparatively simple and economical construction.

Other objects, aspects, and the various advantages of this invention will be apparent upon study of this specification, the drawing, and the appended claims.

STATEMENT OF THE INVENTION

A fluid flow meter is provided comprising a fluid-tight, sandwiched assembly of a first flat faced plate; a first sheet of transparent, fluid impervious material; a second flat faced plate; a second sheet of transparent, fluid impervious material; and a third flat faced plate. All of the plates and transparent sheets are co-extensive in the size of their faces. Each of the plates has at least one elongated slot cut entirely through the plate with the slots of each plate being the same length and width. On assembly the plates are arranged with the corresponding slots in coplanar alignment. The second plate is symmetrically tapered so that it is wider at the upper end than at the lower end and has extensions cut at either end of the slot less than all the way through the plate. The extensions can be on opposite sides of the plate, but are preferably on the side of the plate that is assembled adjacent to the second sheet of transparent, fluid impervious material. The sheet of fluid impervious material and the plate assembled adjacent to an extension in the second plate have perforations therein that are positioned to be aligned with the extensions of the slot in the second plate in the sandwiched assembly. These perforations aligned with the extensions of the slot in the second plate provide a passage for fluid from the outside of the flow meter to the slot in the second plate. A plummet is inserted in the slot in the second plate.

In a preferred embodiment of the invention a perforation in an outside plate is machined and threaded to receive a similarly threaded piping connection. The connection provides passage from the outside into the meter. For use in processes in which particularly corrosive fluid is to be measured, the threaded connections and the tapered plate can be made of metal that is not corroded by the fluid being measured, eliminating excessive costs often experienced when the whole body of a fluid flow meter must be made of exotic material to combat corrosion. In the apparatus set forth herein the corrosive material can be contained within threaded connections on the inlet and outlet of an outside plate and within the slot and slot extensions of the tapered plate with the outside plates, i.e., the first and third plates, being protected by the transparent, fluid impervious material sheets that are sandwiched on either side of the tapered plate.

It is easily seen that the material of construction of the three flat faced plates can be any material that has sufficient structural strength to be formed into the plates and have slots cut therethrough. The usual material of construction would be metal although rigid plastic or glass are also useful.

Any material that can be formed into a transparent sheet that is impervious to the fluid contemplated for measurement can serve as the sheeting that is sandwiched between the plates to provide observation ports in the meter. For general purposes the thickness of the sheeting will depend upon the strength of the sheeting material. Such materials as transparent plastics of polyolefin film, acetate film, Lucite, or Kel-f fluorocarbon polymer are exemplary. If relatively high pressure is to be withstood the plastic sheets can be reinforced with glass plates or, depending upon the fluid being measured, glass plates can be substituted entirely.

The plummet also can be made of any material commonly used for plummets which is resistant to the fluid that will be passed through the flow meter. The plummet can be made of metal, teflon, poly(arylene sulfide), or other fluid-resistant materials.

The sandwiched assembly of plates and transparent sheet can be held together by clamping plates arranged around the edges of the assembly or holes may be drilled through the sandwiched assembly for the insertion of bolts which can be locked with nuts on either end. The arrangement of threaded bolts to hold the sandwiched assembly together in fluid-tight alignment would be apparent to anyone skilled in the art.

Some of the advantages of the device described include the fact that the flow meter can easily be mass produced using simple, inexpensive machining operations in which blanks can be punched or broached to rough dimensions and then ground, burnished, or polished to final tolerances. The tolerances in machining the central, tapered plate and in machining the slot within this plate are not as critical as would be necessary in producing a conical bore; for instance, a 2 percent error in the width of the slot would result in only a 2 percent cross-sectional error while a 2 percent error in the diameter of the conical bore would yield 4 percent error in the circular cross-sectional area of the conical bore. The transparent sheets sandwiched between the plates can be punched out to size for easy production and can be changed without affecting the calibration of the fluid conducting tube. The sandwiched assembly can be made fluid-tight without the use of seals or O-rings since the sealing of ports is accomplished using straight-threaded fittings that can be screwed through the outer pressure plate to bear against the transparent sheet, pressing this sheet firmly against the body of the central plate. These fittings can be screwed in place by such simple devices as jam-nuts run up tightly against the pressure plate.

One of the outstanding features of this device is that a multiplicity of slots can be cut in parallel alignment through a tapered plate and sandwiched with transparent sheets and slotted pressure plates to provide a bank of fluid flow meters within a single apparatus body. Such an apparatus could be of distinct usefulness in the measurement of flows for test apparatus or laboratory apparatus such as chromatographs.

The apparatus and method of this invention can best be understood by studying this specification in conjunction with the drawing. In the drawing FIG. 1 is an exploded view of the apparatus showing an exaggerated taper for the central plate;

FIG. 2 is a front elevation of a sandwiched assembly; and

FIG. 3 is an isometric view of a device according to this invention containing three plummet cavities.

Referring now to FIG. 1 and FIG. 2, the first plate 1 is a rigid flat faced plate having a rectangular face and of sufficient thickness to provide the strength necessary to serve as a pressure plate. This first plate has cut therethrough a slot 3.

Assembled next to the first plate is a first sheet 5 of transparent, fluid impervious material. This sheet is co-extensive in face size with the first plate.

The second plate 7 is assembled with the first transparent sheet 5 and the first plate 1 so that the first transparent sheet 5 is sandwiched between the plates. The second plate is located centrally in the sandwiched assembly and is pierced by elongated slot 9. Slot 9 is co-extensive with slot 3 in the first plate 1 and in the assembled apparatus the slots are coplanar. The second plate also has extensions 11, 13 of slot 9 cut less than all the way through the plate. These extensions of the slot are on the side of the plate next to the first transparent sheet 5 and in conjunction with perforations 12 and 14 extending through the second plate to the side adjacent the second sheet provide in the assembled apparatus access of fluid through the slot 9. The diameter of perforations 12 and 14 is no larger than the inside diameter of fittings 29 and 31 hereinafter described. Perforations 12 and 14 provide access to extensions 11 and 13 respectively.

The second plate 7 has as its most important feature a symmetrical taper so that the upper part of the plate is wider than the lower part of the plate. The taper of this central plate is important because it provides an increase in the size of the bore created by the slot cut through the plate that enables measurement of fluid flow by lifting a plummet in a bore of increasing transverse cross-section. The walls of the slot cut through the plate are parallel. The increase in cross-sectional area for the plummet bore is provided by the increase in the width of the plate from the bottom to the top of the plate.

A second sheet of transparent, fluid impervious material 15 is assembled adjacent to the side of the second plate 7 opposite the side of that plate that contains the extensions 11, 13 of the slot 9. The second transparent sheet has perforations 17, 19 which are aligned with, and of no greater diameter than, the perforations 12 and 14 of the second plate 7. These perforations 17, 19 in the sheet provide access of fluid through the sheet, through perforations 12 and 14 in the second plate into the cavity in the second plate.

The third plate 21 is assembled adjacent to the second transparent sheet 15 so that the second sheet is sandwiched between the third plate 21 and the second plate 7. The third plate also contains a slot 23 cut therethrough which is co-extensive with the slot 9 of the second plate 7 and the slot 3 of first plate 1. In the assembled apparatus the three slots are in coplanar alignment. The third plate also has perforations 25, 27 cut therethrough which are aligned with the perforations 17, 19 in the second transparent sheet to permit the passage of fluid through the plate and second sheet into perforations 12 and 14 of the second plate.

In a preferred embodiment of the invention, connections 29, 31 comprising threads 33, 35 along a length of the connection at least sufficient to pass through the perforations 25, 27 in the third plate 21 are provided for insertion into the perforations 25, 27 of the third plate. This requires that the perforations in the third plate be machined and threaded to mate with the threads on the connections. The connections are inserted through the third plate and jammed against the second sheet to seal the second sheet against the second plate in fluid-tight alignment.

The final element of the apparatus is a plummet 37 or ball float which is inserted in the slot 9 or cavity in the second plate 7 during the assembly of the apparatus. The ball float is sized to fit within the base of the cavity formed by the sides of slot 9 and the sandwiching of the transparent sheets 5, 15 against the faces of second plate 7. The extensions 11, 13 in the slot 9 of the second plate 7 are of sufficiently less depth than the slot to prevent escape of the plummet 37 from the slot 9.

In FIG. 2, which is a view of the face of the assembled apparatus, it can be seen that the slots 23, 9, 3 of the third plate 21, the second plate 7, and the first plate 1 are aligned to provide with the two transparent sheets 15, 5 a view through the slots of the cavity containing the plummet 37. In this view the alignment of the connections 29, 31 through the perforations into the extensions 11, 13 of the slot 9 can also be seen.

Referring now to FIG. 3, an assembled device containing three plummet cavities 41 is shown. Each of the cavities 41 is formed by the juxtaposition of transparent sheets 15, 5 with the slot 9 of tapered plate 7. A plummet 37 rests within each cavity. Pressure plates 21, 1 form the outside protective cover for the sandwiched assembly. All of the elements of the assembly are pierced by a multiplicity of holes through which threaded bolts 43 are passed with nuts 45 on either end tightened to provide fluid-tight assembly.

Referring now to all the drawings, in operation, fluid is passed through the threaded connection 31 at the base of a plummet cavity 39 which passes through the perforation 27 in the third plate 21 and the perforation 19 in the second transparent sheet 15 to give access to perforation 14 and to the extension 13 of slot 9 in the second plate 7. Fluid passes through the extension 13 into the plummet cavity 39 formed by the walls of slot 9 and the sandwiched transparent sheets 15, 5 cut through the upper extension 11 of slot 9 and perforation 12 and through the perforation 17 in the upper portion of sheet 15 and the perforation 25 in the upper portion of the third plate 21 by means of the threaded connection 29. The fluid passing through the cavity 39 lifts the plummet 37 to a height dependent on the volume of fluid flowing therethrough. Calibration of flow can be carried out by methods well known in the art with the calibration being performed after assembly of the apparatus or the size of the cavity can be designed to a specific calculated calibration dependent on the weight of the plummet.

I claim:

1. A fluid flow meter comprising a fluid-tight, sandwiched assembly of a first flat faced plate; a first sheet of transparent, fluid impervious material; a second flat faced plate; a second sheet of transparent, fluid impervious material; and a third flat faced plate; all co-extensive in face size;
   (a) each of said plates having at least one elongated slot cut therethrough, said slots of the same length and width and said plates assembled with slots in coplanar alignment;
   (b) said second plate symmetrically tapered to be wider at the upper end than the lower end; and having extensions of said slot cut less than all the way through said second plate with a perforation extending through the second plate into said extension at each end of the second plate;
   (c) the sheet assembled adjacent to a perforation in the second plate having a perforation therein aligned with the perforation of said second plate;
   (d) the plate assembled adjacent a perforated sheet having a perforation therein aligned with the perforation in said sheet thereby forming passage for fluid from outside the meter to the slot in said second plate; and
   (e) a plummet inserted in the slot in the second plate.

2. A fluid flow meter of claim 1 wherein said plummet in the slot of the second plate is a weighted ball.

3. A fluid flow meter of claim 1 wherein each plate has one slot.

4. A fluid flow meter of claim 1 wherein each plate has a multiplicity of slots in coplanar alignment with the corresponding slots of the other plates.

5. A fluid flow meter of claim 1 wherein the extensions of the slot are cut about half way through said second plate.

6. A fluid flow meter of claim 1 wherein the perforations in the plates are machined and threaded to receive similarly threaded connections.

7. A fluid flow meter of claim 6 wherein the threaded connections are screwed in the perforations in said plates pressing against a transparent, fluid impervious material sheet.

8. A fluid flow meter of claim 1 wherein the slot extensions are both on the same side of the second plate.

* * * * *